United States Patent Office 2,768,969
Patented Oct. 30, 1956

2,768,969

PREPARATION OF GAMMA-CHLOROPROPYL-PHOSPHONYL DICHLORIDE

Arthur F. Isbell, College Station, and Francis T. Wadsworth, Dickinson, Tex., assignors to The American Oil Company, Texas City, Tex., a corporation of Texas No Drawing. Application July 29, 1955,
Serial No. 525,360

5 Claims. (Cl. 260—543)

This invention relates to a novel method for preparing gamma-chloropropylphosphonyl dichloride.

Chloroalkylphosphonyl dichlorides and their derivatives are useful for many purposes. Their phosphonic acids, salts, and esters may be employed as lubricating oil additives, fire retardants, surface active agents useful as dispersants, detergents, and emulsifiers, in the preparation of plasticizers, and as addition agents to asphalt. They may also be used as insecticides.

The preparation of organic phosphonyl dichlorides by the reaction of an organic compound with phosphorus trichloride and oxygen is a relatively new and unexplored chemical reaction. U. S. P. 2,683,168 to W. Jensen et al. discloses that cyclohexane may be reacted to produce cylcohexylphosphonyl dichloride. In U. S. P. 2,683,169 the same inventors point out that chlorinated organic phosphonyl dichlorides can be prepared by reacting an organic chloride with phosphorus trichloride and oxygen.

An object of this invention is to provide a novel method for the preparation of gamma-chloropropylphosphonyl dichloride. Another object is to provide an improved and simple method for the preparation of gamma-chloropropylphosphonyl dichloride which is highly selective in producing the desired product. Other objects will be apparent from the more detailed description of the invention which follows.

To our surprise, it has been found that when cyclopropane and phosphorus trichloride are intimately contacted with oxygen in a reaction zone at a temperature between about —75° C. and +75° C. gamma-chloropropylphosphonyl dichloride is produced. This is highly unexpected in view of the direction of the reaction indicated by U. S. P. 2,683,168 wherefrom it would be anticipated that the product would be cyclopropylphosphonyl dichloride.

The following equation indicates in a purely qualitative manner the changes that occur:

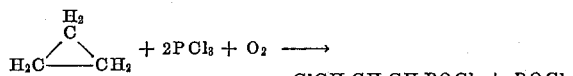

$ClCH_2CH_2CH_2POCl_2 + POCl_3$

More phosphorus oxychloride is usually produced in the reaction than is indicated by the equation.

The reactants which are employed, namely cyclopropane, phosphorus trichloride, and oxygen are preferably employed in a relatively pure state. While air or other oxygen-diluted gas may be used, relatively pure oxygen e. g. commercial oxygen is greatly preferred. When air is employed as the source of oxygen in the reaction the reaction proceeds extremely slowly.

The reaction may be carried out in the gaseous and/or liquid phase. Atmospheric or elevated pressures may be employed, the latter being useful in maintaining the reactants in the liquid phase at higher temperatures. The reaction may be carried out at a temperature within the range of about —75° C. to about +75° C., especially between about —50° C. and about 0° C. At temperatures below about —75° C. the reaction is very slow. At temperatures above about +75° C. the phosphorus trichloride is volatilized. Because an exothermic reaction occurs as oxygen is added, it is necessary to provide means for removing the heat evolved. When liquid cyclopropane and liquid phosphorus trichloride are employed the rate of reaction appears to be governed by the rate at which gaseous oxygen is dispersed and caused to dissolve in the reactants. The dissolved oxygen seems to react instantaneously, hence efficient mixing or dispersion of oxygen within the liquid reactants is highly desirable.

The reaction proceeds even when the proportions of the reactants are varied considerably. However, if the molar ratio of cyclopropane to phosphorus trichloride within the reaction zone is at least 2:1, then maximum yields are obtained. At lower molar ratios, lower yields are produced. Increasing the molar ratio of cyclopropane to phosphorus trichloride beyond 2:1 will not substantially improve the yields.

The reaction may be carried out by any of a number of different procedures. Oxygen may be added slowly to a reaction zone containing the proper molar ratio of cyclopropane and phosphorus trichloride. Another method of carrying out the reaction is to add oxygen and phosphorus trichloride to a reaction zone containing the cyclopropane. The added oxygen and phosphorus trichloride are introduced preferably at a rate such that the incoming oxygen oxidizes the phosphorus trichloride at about the rate that the phosphorus trichloride is added. Although not necessarily a preferred technique, the gaseous cyclopropane can be introduced with oxygen into the reaction zone containing phosphorus trichloride.

The reactants should be free of moisture. Conventional drying means such as Drierite, for oxygen drying, or other suitable means may be used for this purpose. A number of different materials inhibit the reaction. Iron, copper, sulfur, and various compounds thereof, as well as rubber, boron trifluoride, and nitro compounds such as nitrocyclohexane have a powerful inhibiting effect upon the reaction. Glass or polyethylene linings in the reactor and auxiliary equipment function very satisfactorily. Flexible connections of Tygon may be used where rubber connections would normally be employed.

Certain experiments were carried out which illustrate the method of this invention. Glass equipment was used and flexible connections were made of Tygon rather than rubber. In the experiments phosphorus trichloride and cyclopropane were charged into a glass reactor which was maintained at the desired temperature by means of a Dry-Ice-alcohol bath. Pure elemental oxygen was passed through a rotameter, through a drying tube containing Drierite and then into the reactor. The exit of the incoming oxygen line was positioned directly below the bottom opening of an inverted cone-shaped stirrer which had holes along the circumference of the cone at about the equator. The stirrer operated at 2400 R. P. M. and under these conditions the oxygen was dispersed in the form of microscopic bubbles in the reaction liquid. A Dry Ice condenser prevented the loss of cyclopropane and a soda-lime tower absorbed any acid gases which passed off with the unabsorbed oxygen. A wet-gas meter measured the quantity of unabsorbed oxygen. The oxygen flow and stirring were started and the reaction was allowed to continue until oxygen absorption by the reactants ceased and there was no further evolution of heat. Oxygen was introduced at a rate equal to the rate to which it was absorbed. The products were transferred to a distilling flask and distilled at atmospheric pressure to remove unreacted materials until a pot temperature of about 160° C. was reached. The remainder of the product was distilled at 2 mm. Hg to recover the gamma-chloropropylphosphonyl dichloride. The vacuum line was trapped to prevent phosphorus oxychloride from entering the mechanical pump.

*Example I*

3.71 gram moles of cyclopropane and 1.25 gram moles of phosphorus trichloride (molar ratio of 2.91:1) were added to the reactor. Because the oxygen inlet tube was positioned below the liquid level of the phosphorus trichloride, it became plugged with phosphorus oxychloride. To prevent this the temperature was raised from −35° C. to about +5° C. by allowing the excess cyclopropane to evaporate slowly. A reaction time of about 5 hours was used. The yield of gamma-chloropropylphosphonyl dichloride was 16.1 grams, corresponding to a yield of 6.6% based on phosphorus trichloride.

*Example II*

8.07 gram moles of cyclopropane and 2.50 gram moles of phosphorus trichloride (which corresponds to a molar ratio of cyclopropane to phosphorus trichloride of 3.23:1) were used. To prevent plugging of the oxygen inlet tube with solid phosphorus oxychloride, the dispersion end of the tube was raised above the surface of the liquid reactants and oxygen was passed in against a 10 centimeter head of mercury, while the liquid reactants were agitated vigorously. A reaction temperature of about −30° to −35° C. was used. The reaction time was approximately four hours. The yield of gamma-chloropropylphosphonyl dichloride was 36.4 grams which corresponds to a yield of 7.2% based on phosphorus trichloride.

The identity of the product (gamma-chloropropylphosphonyl dichloride) was proved by comparing its properties with synthesized gamma-chloropropylphosphonyl dichloride, the corresponding phosphonic acid and the corresponding diisopropyl ester thereof. The latter compounds were prepared by a multi-stage synthesis. In this synthesis trimethylene glycol was converted to trimethylene chlorohydrin in the manner described in "Organic Synthesis," volume 1, page 519 (1932). This was converted to trimethylene iodochloride by the method described by Case in J. A. C. S., volume 55, page 2929 (1933). The latter compound was converted to the ester, diisopropyl gamma-chloropropyl phosphonate. The latter reaction was carried out by refluxing one mole of trimethylene iodochloride with one mole of triisopropyl phosphite in vacuo for about 18 hours, removing isopropyl iodide as rapidly as it was formed. Vacuum distillation of the product produced about a 72% yield of diisopropyl gamma-chloropropyl phosphonate which boiled at 98° to 105° C. at 1.5 mm. Hg. A fraction boiling constantly at 106° C. at 1.8 mm. Hg was used for analysis and for the determination of physical constants. The percentage of phosphorus was analyzed to be 13.13% as compared with the calculated 12.77% by weight. The physical constants of the diisopropyl ester were $n_D^{20}=1.4395$; $d_4^{20}=1.0707$; molecular refraction=59.67 (from the Lorenz-Lorentz equation wherein $$\frac{n^2-1}{n^2+2} \times \frac{\text{Mol. Wt.}}{d} = \text{molecular refraction})$$

The molecular refraction which was calculated from summation values was 59.02 (using C=2.418, H=1.1, carbonyl O=2.211, Cl=5.967, and P-phosphonic acid=4.270 in calculating the sum of the atomic refraction).

A sample of the diisopropyl gamma-chloropropyl phosphonate was hydrolyzed and the resultant acid solution was evaporated to dryness. The remaining white solid was recrystallized from benzene and from chloroform producing white plates melting at 106.5–107.0° C. (cor.). Elemental analyses revealed that it contained about 22.21% Cl and 19.51% P as compared with the calculated 22.37% Cl and 19.54% P. A sample of the acid chloride from the reaction of cyclopropane with phosphorus trichloride and oxygen was hydrolyzed and the resulting acid also recrystalized from benzene and from chloroform. The white plates melted at 105–106° C. (cor.), thus providing a good confirmation of the identity of my reaction product.

A sample of the diisopropyl gamma-chloropropyl phosphonate was converted to gamma-chloropropylphosphonyl dichloride by reaction thereof with phosphorus pentachloride (using about 2 moles of phosphorus pentachloride per mole of the ester). Phosphorus oxychloride was removed from the resulting liquid and the gamma-chloropropylphosphonyl dichloride was recovered at 88°–90° C. at 2 mm. Hg. A fraction boiling constantly at 88° C. at 2 mm. Hg was used in determining the physical constants. A chlorine analysis revealed that it contained 54.34% chlorine as compared with the calculated 54.43% chlorine. The hydrolysis equivalent found was 65.83 as compared with the calculated 65.14. The physical constants found were $n_D^{20}=1.4960$; $d_4^{20}=1.4593$; molecular refraction (from the Lorenz-Lorentz equation)=39.12; molecular refraction (calculated from the summation values)=38.24. The physical constants of a sample of the gamma-chloropropylphosphonyl dichloride prepared by the reaction of cyclopropane with phosphorus trichloride and oxygen were found to be $n_D^{20}=1.4928$; $d_4^{20}=1.4580$; molecular refraction (from the Lorenz-Lorentz equation)=38.94; hydrolysis equivalents=66.31. Thus the properties of the gamma-chloropropylphosphonyl dichloride and its hydrolysis product checks very well with the properties of the same compounds synthesized via a multi-process operation.

The fire retardant properties of both the gamma-chloropropylphosphonyl dichloride and its diisopropyl ester were demonstrated in a conventional type test. Strips of cotton muslin about 1″ by 8″ were saturated individually with (1) pure cyclohexane, (2) cyclohexane containing one gram of the acid chloride per five ml. of cyclohexane and, (3) cyclohexane containing one grame of the diisopropyl ester per five ml. of cyclohexane. The strips were dried to remove cyclohexane and a flame from a Bunsen burner was applied to each strip individually. The strips which had been treated with pure cyclohexane burned even when the flame was removed. Those strips which had been treated with gamma-chloropropylphosphonyl dichloride or the dissopropyl ester thereof charred so long as the flame was applied but ceased to do so when the flame was removed.

Thus having described the invention, what is claimed is:

1. The method of preparing gamma-chloropropylphosphonyl dichloride which method comprises intimately contacting cyclopropane and phosphorus trichloride with oxygen in a reaction zone at a temperature between about −75° C. and +75° C.

2. The method of claim 1 wherein a molar ratio of cyclopropane to phosphorus trichloride of at least about 2:1 is employed in the reaction zone.

3. The method of claim 1 wherein said contacting is carried out at a temperature between about −50° C. and 0° C.

4. The method of claim 1 wherein oxygen is introduced into the reaction zone at a point above the surface of the liquid reactants.

5. The method of preparing gamma-chloropropylphosphonyl dichloride which method comprises intimately contacting cyclopropane and liquid phosphorus trichloride with oxygen in a reaction zone at a temperature between about −50° C. and 0° C., said cyclopropane and phosphorus trichloride being present in the reaction zone in a ratio of at least two moles of cyclopropane per mole of phosphorus trichloride, and recovering gamma-chloropropylphosphonyl dichloride from the resultant mixture.

No references cited.